United States Patent Office 3,268,671
Patented August 23, 1966

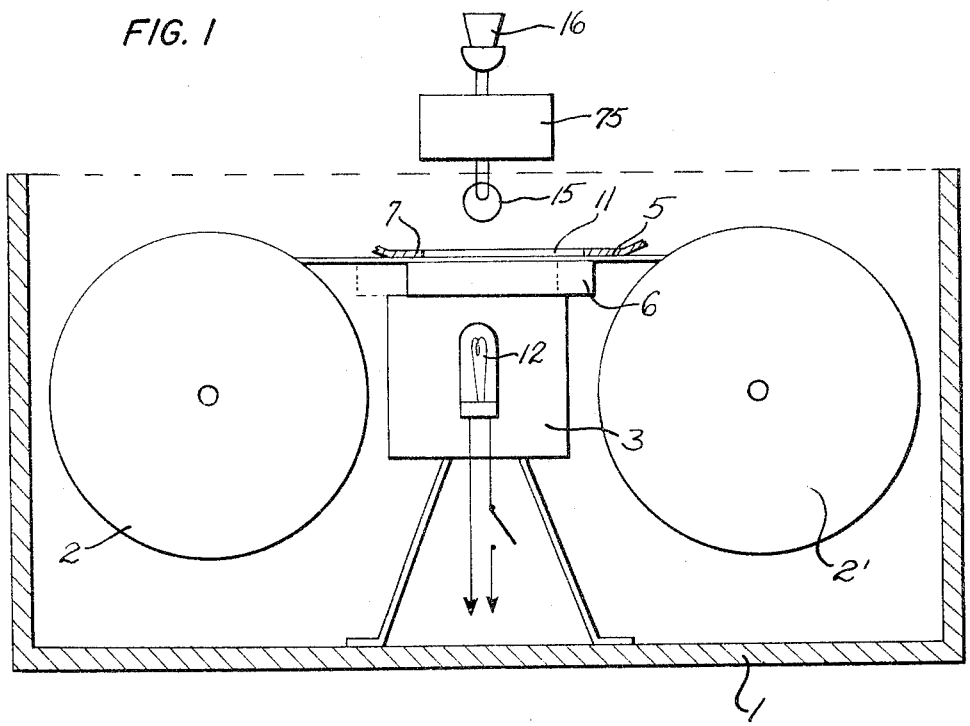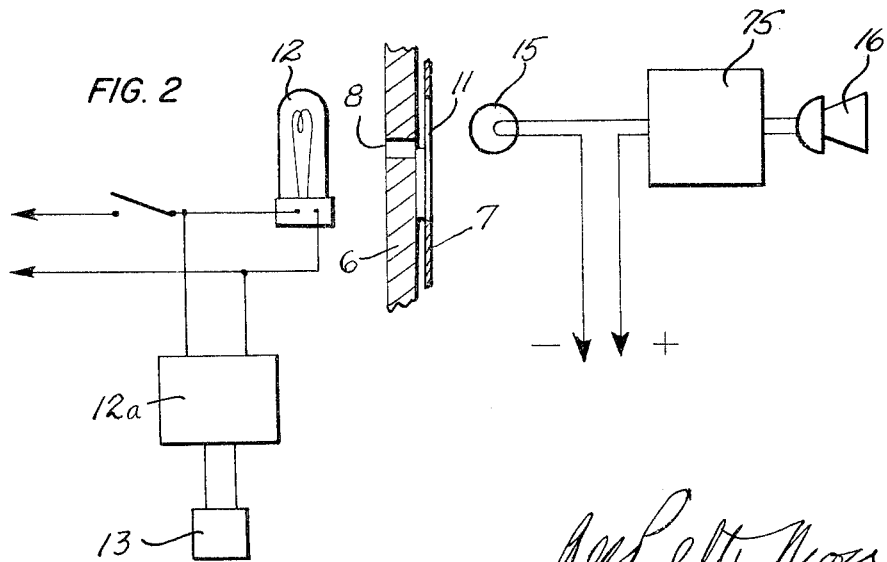

3,268,671
PORTABLE VARIABLE DENSITY SOUND
RECORDER AND REPRODUCER
David Pelton Moore, Marlow, N.H.
(9210 Flower Ave., Silver Spring, Md.)
Filed Aug. 18, 1965, Ser. No. 480,745
4 Claims. (Cl. 179—100.3)

My present invention relates to improvements in Sound-on-Film Recording and Reproducing Machines, one object of the invention being the provision of a portable machine in which a single fixed slit block and lamp are employed in conjunction with a microphone actuated system to employ the lamp as a sound modulated lamp and a photoelectric cell controlled circuit with its amplifier is also employed in which the lamp may be converted to an exciter lamp.

In order that the invention may be fully understood and its numerous advantages appreciated, attention is invited to the accompanying drawings, in which:

FIGURE 1 is a view of a case or cabinet in which is located the present apparatus.

FIGURE 2 is a diagrammatical view of one type of circuit employed in this apparatus.

Referring to the drawings, the numeral 1 designates a portable case or cabinet, in which the apparatus is mounted, the top and front side of the cabinet being removed.

Removably mounted in the cabinet are the feed reel 2, and the take-up reel 2' (the motor not being shown), with the support 3 for the stationary or fixedly mounted slit block 6, having the slit 8.

The emulsion film 5, carried by the respective reels, is threaded between the slit block 6 and the plate 7 having opening 11, and this film is preferably film made by the Polaroid Company and/or the Eastman Kodak Company, using their black-and white emulsion film that does not require dark room developing, and which, when the film has been exposed through the modulation of the light from the lamp 12, when used as a recording lamp, can within a few minutes, as with the Polaroid ten second film, be removed and then its paper strip removed to expose the then developed sound track on the film.

To record sound on this film, a microphone 13, and its amplifier 12a are supplied with current, and the lamp 12 is now a recorder lamp and as above-noted acts through the slit of the slit block upon the film moving at the proper rate of speed from the reel 2 to the reel 2'.

After the film has been thus affected and removed from the cabinet, its paper strip removed and then re-wound on the reel 2 and connected for winding upon the reel 2', the lamp 12 is now converted to a reproducing or exciter lamp.

Upon the opposite side of the slit block to the lamp is a photoelectric cell 15 that is now acted upon by the light from the lamp passing through the slit of the slit block and sound track of the film, so that through its amplifier 75, sound is reproduced from the film to the sound reproducing means or loudspeaker 16.

From the foregoing description, it will be seen that through the use of a single fixed slit block and lamp, a combined Sound-on-Film Recording and Reproducing Machine is produced, and which when mounted in the cabinet is a compact portable device is provided.

Although the type of film referred to above is preferred, the present types of 8 mm. or 10 mm. photographic films can be employed, requiring that the film be loaded and removed from the machine in a dark room, and the same developed in the usual manner. Also, any film that carries sound recordings made by this machine may be used as master films for making albums and other types of sound-on-film records.

What I claim as new is:

1. In a sound-on-film recorder reproducer, the combination of means for continuously moving an emulsion film, a fixedly mounted slit block through which said film is passed, the slit thereof being to limit the area of light upon the film as the film is moved thereby, a lamp mounted adjacent the slit thereof and through which said slit the light from the lamp impinges on the film to form a variable density sound track on the film, a microphone, an amplifier to be connected to the lamp and to sound modulate the lamp when recording sound on the film, a photoelectric cell disposed upon the side of the slit block opposite to the lamp, an amplifier and sound reproducer connected to the photoelectric cell, and means to energize the lamp and convert it to an exciter lamp whereby the photoelectric cell is influenced by the lamp through the sound track of the film to produce sound in the sound reproducer.

2. A sound-on-film recorder and reproducer, the combination with a light-proof cabinet, of an electric lamp, film directing means mounted in the cabinet and having a light directing slit therein, means carrying a sensitized emulsion film mounted to move the film past said electric lamp and the slit which limits the area of light exposed to the film, a microphone, its amplifier to be connected to the lamp when recording sound upon the film, a photoelectric cell to receive light from the lamp operably connected to an amplifier and sound reproducer, and means for energizing said lamp as an exciter lamp when the film is being used to reproduce sound.

3. In a sound-on-film recorder and reproducer, the combination of a light-proof cabinet, a film directing member having a sound track forming slit, a lamp adjacent the slit, an emulsion carrying film mounted to be moved continuously past the slit to have light rays from the lamp impinge thereon, a microphone, and its amplifier to be connected to the lamp when recording a sound track on the film, a photoelectric cell disposed adjacent the said slit and upon the opposite side of its carrier to the lamp, an amplifier and sound reproducer connected to the cell, and means for energizing the lamp to convert same to an exciter lamp and to have its light impinge upon the moving sound track film to in turn reproduce sound through the amplifier and sound reproducer influenced by the cell.

4. In a sound-on-film recording and reproducing machine, the combination of a microphone and amplifier, and a photoelectric cell and its amplifier, and sound reproducer, a film feeding reel and take-up reel and a film, means for guiding the film provided with a light admission slit to limit the area of light upon the moving film to form a sound track thereon, means for connecting the lamp to the microphone and its amplifier when recording sound, and means for converting said lamp into an exciter lamp, whereby the photoelectric cell is influenced by the light through the slit to reproduce sound recorded on the sound track of the film.

References Cited by the Examiner

UNITED STATES PATENTS 2,402,095   6/1946   Slyfield _____ 179—100.3

OTHER REFERENCES

Schrage, W. E., Wireless World, "The Phono-Reel," Nov. 29, 1935, p. 557.

Tremaine, H. W., The Audio Cyclopedia, Bobbs-Merrill, N.Y., 1959, TK 5981 T72 C. 3, pp. 687–691.

BERNARD KONICK, Primary Examiner.

JAMES W. MOFFITT, IRVING SRAGOW, Examiners.

A. I. NEUSTADT, Assistant Examiner.